United States Patent
Mumola et al.

(10) Patent No.: US 6,646,779 B2
(45) Date of Patent: Nov. 11, 2003

(54) STRAIN-ISOLATED STAGE MIRROR

(75) Inventors: Peter B. Mumola, Trumbull, CT (US); Flemming Tinker, Higganum, CT (US); Steven R. Patterson, Concord, CT (US)

(73) Assignee: Zygo Corporation, Middlefield, CT (US)

( * ) Notice: Subject to any disclaimer, the term of this patent is extended or adjusted under 35 U.S.C. 154(b) by 0 days.

(21) Appl. No.: 10/002,408

(22) Filed: Nov. 15, 2001

(65) Prior Publication Data

US 2002/0085262 A1 Jul. 4, 2002

Related U.S. Application Data (60) Provisional application No. 60/249,947, filed on Nov. 20, 2000.

(51) Int. Cl.[7] .................. G02B 26/00; G02B 26/08; G02B 7/02; F16M 13/00; H01L 29/82
(52) U.S. Cl. .................. 359/291; 359/214; 359/223; 359/224; 359/819; 359/820; 359/857; 248/604; 248/593; 248/467; 257/415; 257/418
(58) Field of Search ................... 359/290, 291, 359/298, 198, 222, 223, 224, 214, 230, 819, 857, 820; 248/604, 593, 466, 467, 468; 257/418, 415, 420; 310/36, 90, 309

(56) References Cited

U.S. PATENT DOCUMENTS

| | | | | |
|---|---|---|---|---|
| 4,421,381 A | * | 12/1983 | Ueda et al. | 359/214 |
| 4,832,452 A | * | 5/1989 | Eisler | 359/819 |
| 4,997,158 A | | 3/1991 | James | 248/604 |
| 5,781,355 A | | 7/1998 | Meier | 359/871 |
| 5,798,879 A | | 8/1998 | Salvio | 359/857 |
| 5,877,905 A | | 3/1999 | Schwartz | 359/846 |

FOREIGN PATENT DOCUMENTS

DE  42 26 027 A1  2/1994

* cited by examiner

Primary Examiner—Loha Ben
(74) Attorney, Agent, or Firm—Fish & Richardson P.C.

(57) ABSTRACT

A strain-isolated mirror is made from a substrate having first and second body portions. First and second connecting portions extend across a gap between the first body portion and the second body portion. A first flexural hinge on the first second connecting portion couples the second connecting portion to the first body portion.

23 Claims, 5 Drawing Sheets

STRAIN-ISOLATED STAGE MIRROR

RELATED APPLICATIONS

This application claims the benefit of the priority date of U.S. provisional application 60/249,947, filed on Nov. 20, 2000, the contents of which are herein incorporated by reference.

FIELD OF INVENTION

This invention relates to distance-measuring interferometry, and in particular, to mirrors for reflecting measurement beams in an interferometric system.

BACKGROUND

In the fabrication of an integrated circuit, there are steps during which a wafer rests on a moveable stage under a projector. As the stage moves, it experiences linear translation in a direction parallel to one of two coordinate axes that define the plane of the wafer. During these steps, it is desirable to know, with great precision, the position of the moveable stage relative to the projector.

One approach to determining the motion of the stage is to use an interferometer to determine the distance to a measurement spot along the edge of the stage with a measurement beam of an interferometer. A mirror attached to the stage at the measurement spot reflects the measurement beam back to the interferometer. By combining this returning beam with a reference beam, the interferometer detects motion of the mirror, and hence the stage.

As the stage translates, the measurement spot moves relative to the mirror, which, being attached to the stage, also translates with the stage. As a result, the laser beam, which illuminates the measurement spot, illuminates different portions of the mirror as the stage translates in a direction transverse to the direction of beam propagation. To the extent that the mirror is perfectly flat, the fact that the laser beam illuminates different portions of the mirror makes no difference to the measurement of distance.

In many cases, the mirror will deform. Such deformation can arise, for example, from internal stresses within the stage to which the mirror is attached or integrated with. These deformations affect the profile of the mirror's reflective surface, causing it to be bowed or twisted in unpredictable ways.

Deformations resulting from internal stresses in the mirror body can, to some extent, be reduced by making the mirror body sufficiently massive. However, the additional mass of such a mirror body, when attached to the stage, make it more difficult to accelerate the stage. This reduces the throughput of the system.

SUMMARY

In a strain-isolated mirror according to the invention, stresses experienced by the body of the mirror are prevented from being communicated to the reflecting surface of the mirror. As a result, even if the body of the mirror deforms, the reflecting surface remains flat. This is achieved by carving two portions, a body portion and a blade portion, out of a substrate and providing a coupling between these two portions that isolates the blade portion from stresses experienced by the body portion.

In one embodiment, a substrate having first and second body portions forms the strain-isolated mirror. First and second connecting portions extend across a gap between the first body portion and the second body portion. A first flexural hinge on the second connecting portion couples the second connecting portion to the first body portion.

In one aspect, the second connecting portion can also include a second flexural hinge for coupling the second body portion to the second connecting portion. In another aspect, the first connecting portion also includes a third flexural hinge for coupling the first body portion to the first connecting portion.

The second connecting portion can include a central portion and a first end portion adjacent to the first body portion. In this case, the central portion is thicker than the first end portion. The second connecting portion can also include a second end portion adjacent to the second body portion. In this case, the central portion is again thicker than the second end portion also.

The first connecting portion can also include first and second end portions separated by a central portion. The first and second connecting portions are both thicker than the central portion. This results in the formation of a structure having a waist.

In another embodiment, the strain-isolated mirror includes first and second body portions and a support system to connect the first and second body portions to each other while isolating the second body portion from stress in the first body portion.

These and other features and advantages of the invention will be apparent from the following detailed description and the accompanying figures, in which:

DETAILED DESCRIPTION

Figure 1:
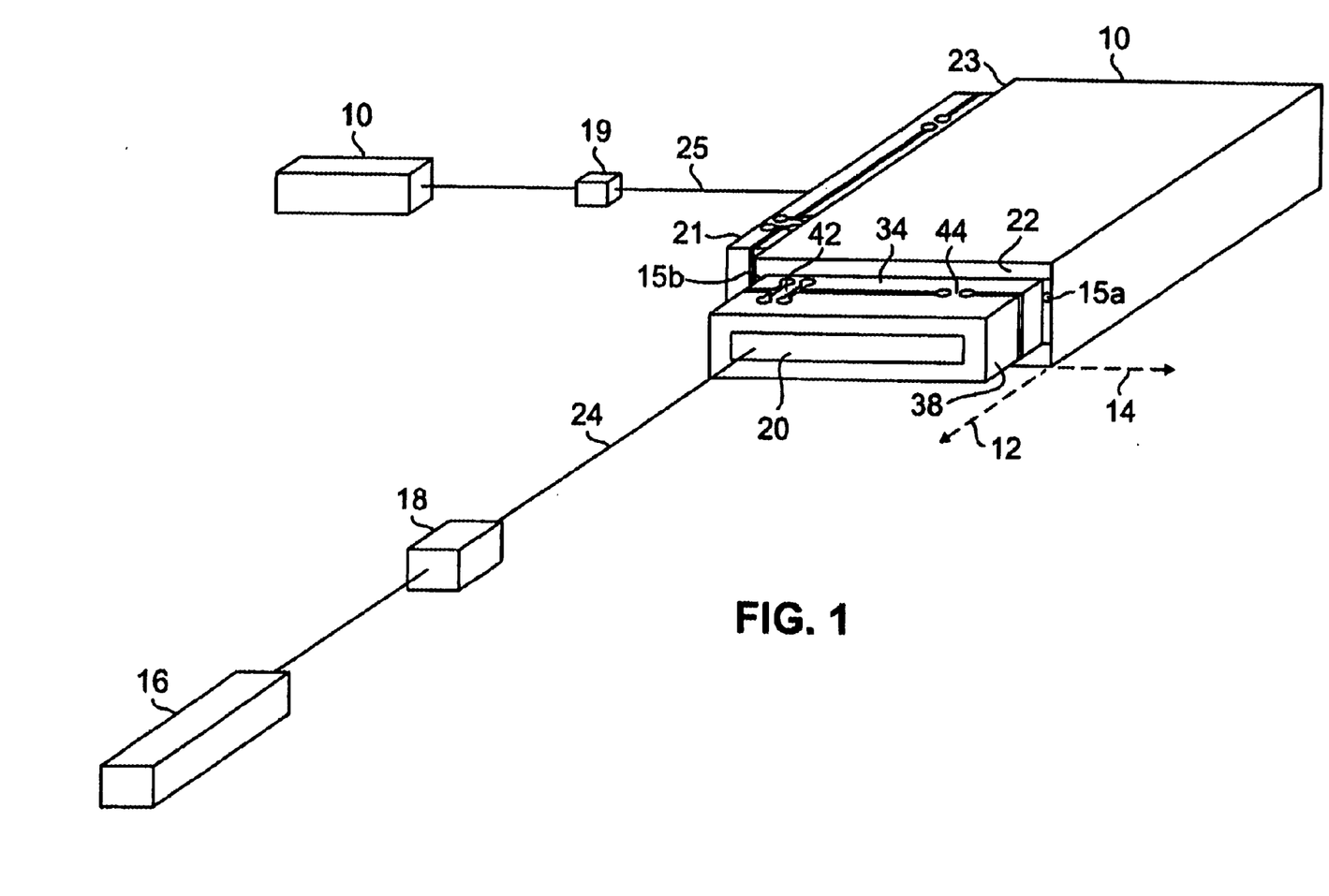
FIG. 1 shows a stage carrying two mirrors according to the invention.

FIG. 1 shows a stage 10 configured to translate along first and second orthogonal directions 12, 14. A first measurement beam 24 emitted by a first laser 16 associated with a first interferometer 18 illuminates a first strain-isolated mirror 20 screwed onto a first edge 22 of the stage 10 with first and second fastening screws 15a, 15b. As the stage 10 translates along the first axis 12, the first interferometer 18 detects a change in the distance between itself and the first mirror 20, and hence the stage 10. As the stage 10 translates along the second axis 14, the laser 16 illuminates different portions the first mirror 20. To the extent that the first strain-isolated mirror's reflective surface is parallel to the second axis 14, the first interferometer 18 detects no change in the distance between itself and the first strain-isolated mirror 20.

In addition, a second measurement beam 25 from a second laser 17 associated with a second interferometer 19 illuminates a second strain-isolated mirror 21 screwed onto a second edge 23 of the stage 10. As the stage 10 translates along the second axis 14, the second interferometer 19 detects a change in the distance between itself and the second strain-isolated mirror 21, and hence the stage 10. As the stage 10 translates along the first axis 12, the laser 16 illuminates different portions of the second strain-isolated mirror 21. To the extent that the second strain-isolated mirror's reflective surface is parallel to the first axis 12, the second interferometer 19 detects no change in the distance between itself and the second strain-isolated mirror 21.

Figure 2:
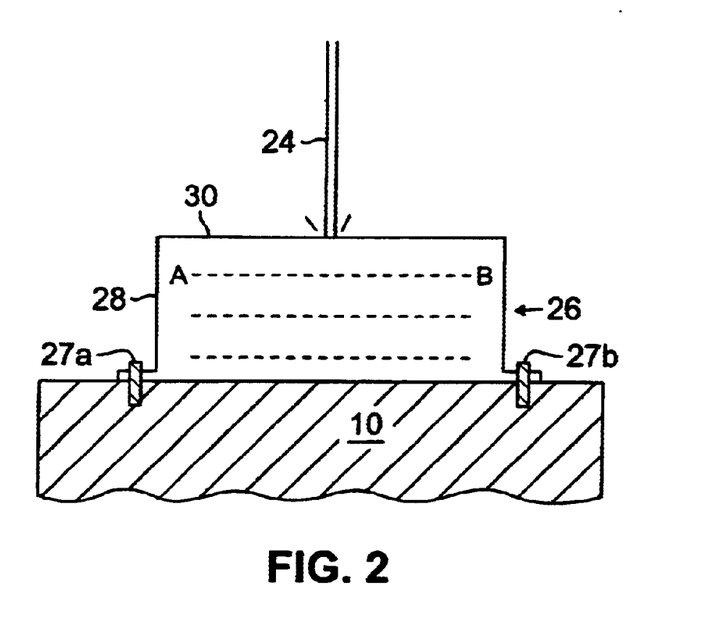
FIGS. 2 and 3 show a conventional mirror before and after deformation.

FIG. 2 illustrates the difficulty associated with mounting a conventional mirror 26 onto the stage 10 shown in FIG. 1. Like the first and second strain-isolated mirrors 20, 21 shown in FIG. 1, the conventional mirror 26 is screwed onto the stage 10 with first and second screws 27a, 27b. However, other mounting methods, can be used to mount either the conventional mirror 26 or the first and second strain-isolated mirrors 20, 21 onto the stage 10. For example, the conventional mirror 26 or the first and second strain-isolated mirrors can adhesively or optically contact the stage 10.

Figure 3:
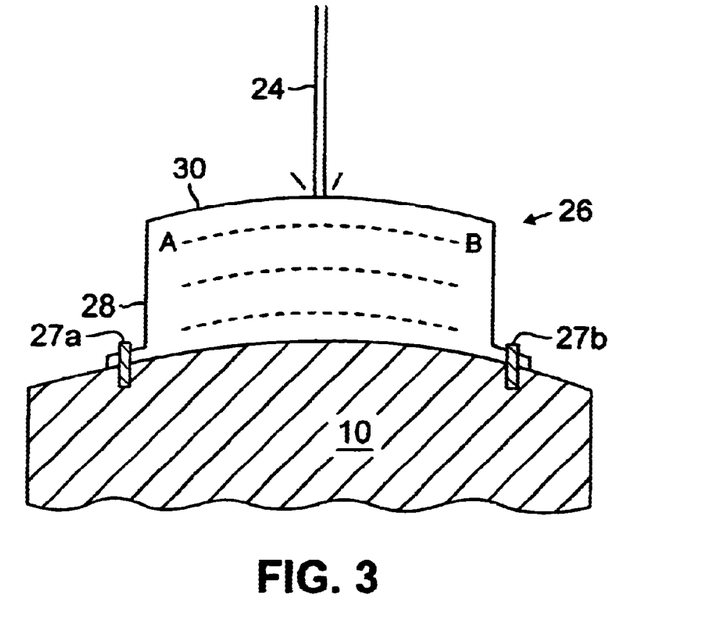

The conventional mirror 26 includes a body portion 28 having a mirrored surface 30. When subject to stress, the body portion 28 can deform. This causes the mirrored surface 30 to also deform, as shown in FIG. 3. As the stage 10 translates along the second axis 14, the measurement beam 24 illuminates different portions of the mirrored surface 30, some of which are closer to the interferometer 18 than others. The resulting interferometer measurement would then lead to the erroneous conclusion that the stage 10 had followed a curved path.

In contrast to the conventional mirror 26 shown in FIGS. 2 and 3, a strain-isolated mirror according to the invention includes structure for preventing changing stress experienced by the body portion from deforming the mirrored surface. One embodiment of the strain-isolated mirror 20, shown in perspective in FIG. 1 and in cross-section in FIG. 4, includes a body portion 34 having a planar top surface 36 and a blade portion 38 having a planar bottom surface 40. First and second connecting portions 42, 44 extend between the body portion 34 and the blade portion 38. The first and second connecting portions 42, 44 thus form a gap 46 that separates the body portion 34 from the blade portion 38.

A constriction in the first connecting portion 42 as it merges into the body portion 34 forms a first flexural hinge 48. Similarly, constriction in the first connecting portion 42 as it merges into the blade portion 38 forms a second flexural hinge 50. Finally, a waist portion in the second connecting portion 44 forms a third flexural hinge 52. The flexural hinges 48, 50, 52 are designed to bend easily along an axes through the centers of the flexural hinges 48, 50, 52 and normal to the cross-section shown in FIG. 4. That portion of the first connecting portion 42 between the first and second flexural hinges 48, 50 will be referred to as a "linkage bar" 51.

Figure 4:
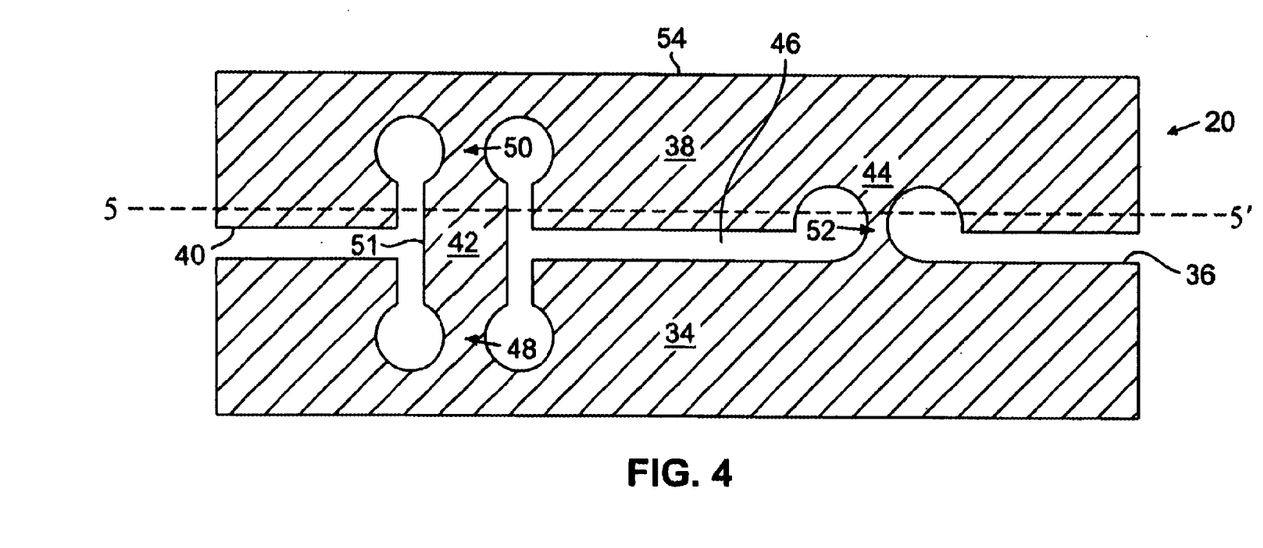
FIGS. 4 and 5 shows a cross-section and plan view of a mirror according to the invention.

Other types of flexural hinges can be used in addition to those illustrated in FIG. 4. However, those shown in FIG. 4 are simple to manufacture.

In principle, the voids adjacent to the flexure hinges 48, 50, 52 can be any shape. In FIG. 4, these voids are circular. However, this is only a byproduct of the manufacturing process described below.

Figure 5:
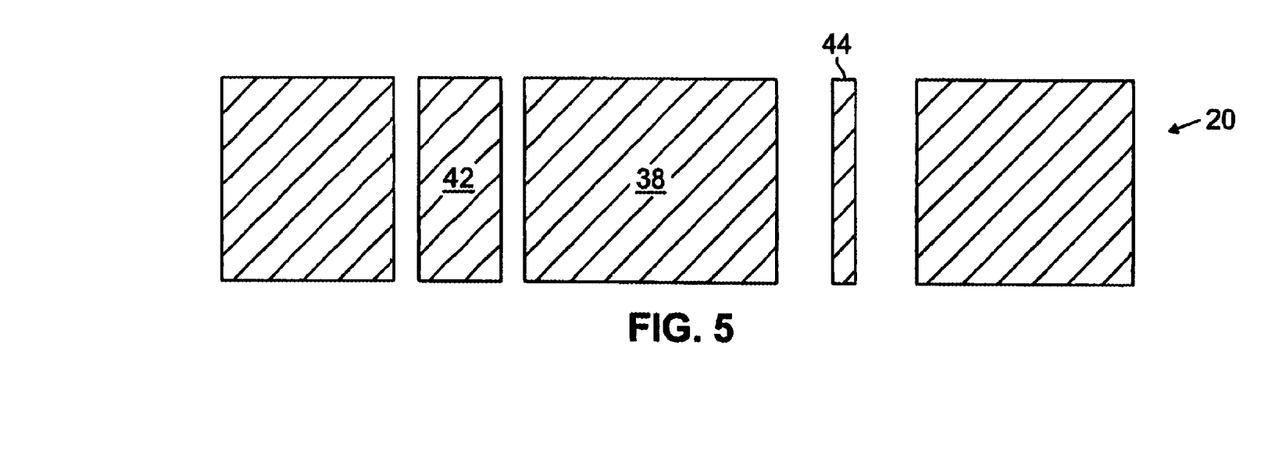

FIG. 5, which is a plan view of the strain-isolated mirror 20 shown in FIG. 4, shows that the first and second connecting portions 42, 44 form rails having uniform cross-sections and extending across the strain-isolated mirror 20. This enables the first and second connecting portions 42, 44 to support the blade portion 38 and the body portion 34 along their entire lengths. However, this is not an essential feature. The first and second connecting portions 42, 44 can have gaps along their length. Or the first and second connecting portions 42, 44 can have cross-sections that vary along their length. Additionally, either the first or second connecting portion, or both, can extend part-way across the strain-isolated mirror 20. However, as will be apparent below, the configuration shown in FIG. 5 is the easiest to manufacture.

Figure 6:
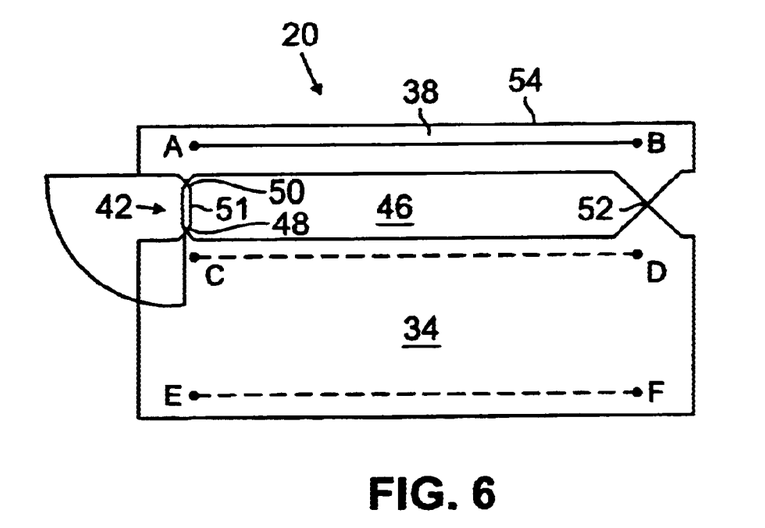
FIGS. 6 and 7 shows the mirror of FIG. 4 before and after deformation.
Figure 7:
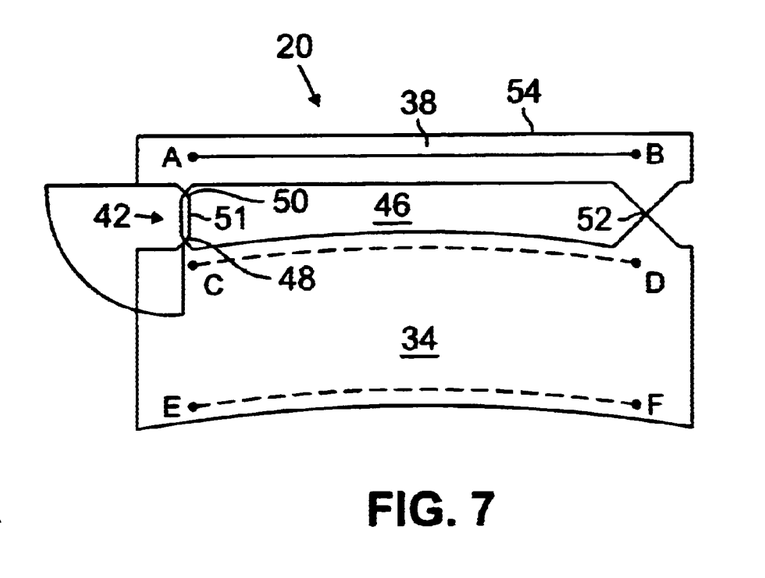

FIGS. 6 and 7 illustrate the principle by which the invention isolates the blade portion 38 from strain resulting from stresses experienced by the body portion 34. In FIG. 6, there are no appreciable changes to stresses in the body portion 34. In FIG. 7, a change in the stress experienced by the body portion 34 has caused deformation of the top surface 36 of the body portion 34. In the absence of any flexural hinges, the first connecting portion 42 would have exerted a force tending to deform the blade portion 38 as well.

However, in this case, some of the force that would otherwise deform the blade portion 38 instead rotates the first connecting portion 42 about the first and second flexural hinges 48, 50. As shown in FIG. 7, the first connecting portion 42 is no longer perpendicular to the blade portion 38 and to the body portion 34.

Figure 8:
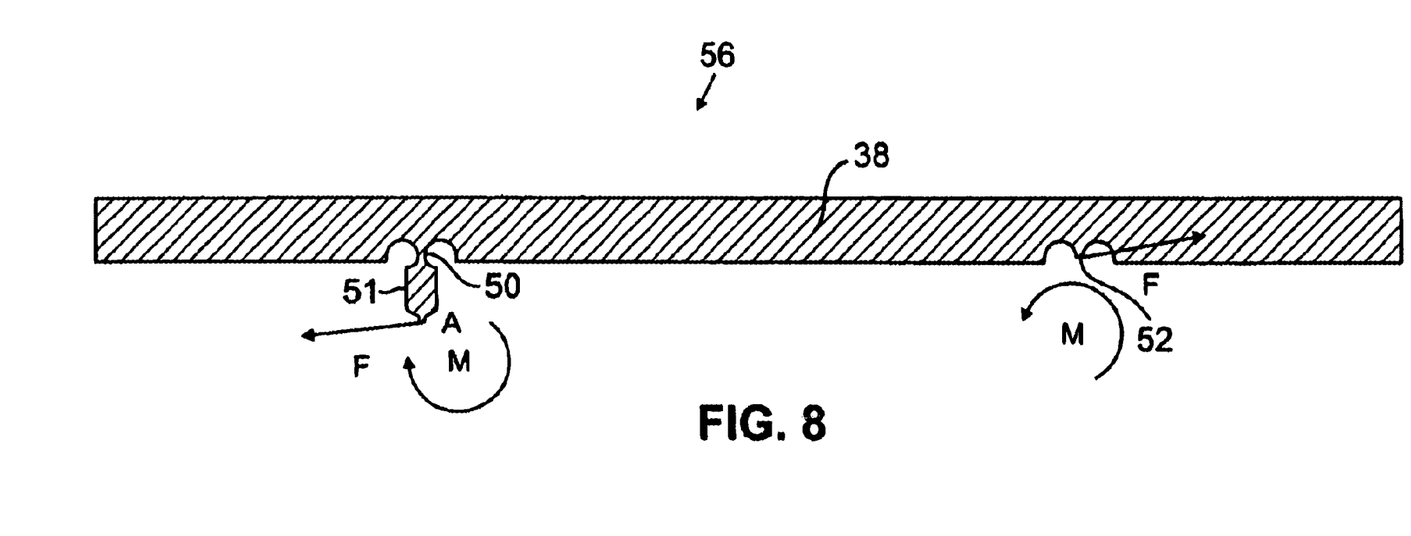
FIG. 8 is a free-body diagram of a portion of the mirror of FIG. 4.

FIG. 8, which is a free-body diagram of a system 56 defined by the two connecting portions 42, 44 and the blade portion 38, illustrates in more detail what is believed to be the mechanism through which the flexural hinges 48, 50, 52 isolate the blade portion 38. Any change in stress experienced by the body portion 34 can only be transmitted to the blade portion 38 through the first and second connecting portions 42, 44. Because the connecting portions 42, 44 are small, the in-plane stress distribution through each connecting portion 42, 44 can be approximated by a first force and a first moment present the first connecting portion 42 and a second force and second moment present in the second connecting portion 44. At static equilibrium, the first and second forces and the first and second moments, by definition, are equal in magnitude and opposite in direction.

When the stresses transmitted to the system 56 change, the system 56 responds by changing its shape. This change in the system's shape is the sum of the changes made by each of the system's constituent elements in response to that change. The changes in the constituent elements are driven by changes in the first and second forces and the first and second moments.

The response of the system 56 to changes in the first and second forces include bending of the blade portion 38, the linkage bar 51, and the second flexural hinge 50. The bending experienced by each component in response to the stress will be inversely proportional to its stiffness. The second flexural hinge 50, which is far more flexible than either the blade portion 38 or the linkage bar 51, therefore bends the most. The blade portion 38 will consequently bend considerably less than it would have in the absence of the second flexural hinge 50 and linkage bar 51. For similar reasons, the response of the system 56 to changes in the equal and opposite moments introduced through the first and third flexural hinges 48, 52 will be dominated by bending at the three flexural hinges 48, 50, 52.

In an alternative embodiment, the second connecting portion 44, like the first connecting portion 42, includes a pair of flexural hinges. This is undesirable for mirrors that are mounted on a moveable stage 10 because of the oscillations resulting from stopping and starting the stage 10. However, such a configuration may be practical for a strain-isolated mirror 20 that is mounted to a stationary platform.

A strain-isolated mirror 20 according to the invention is manufactured by drilling six pairs of holes into a substrate. The substrate remaining between each pair of holes forms a flexural hinge. A saw, such as a diamond band saw, is then inserted into each hole and used to cut out the interior of the substrate, thereby forming the gap 46 separating the blade portion 38 and the body portion 34. The saw can also be used to cut out the portion of the first connecting portion 42 between the first and second flexural hinges 48, 50. Alternatively, the gap 46 can be formed by using water jet carrying abrasive particles.

In the embodiment described herein, the substrate is a glass-ceramic matrix sold under the name ZERODUR™. However, the substrate can also be another glass-ceramic matrix, glass, ceramic, metal, or composite.

Other methods can be used to machine the substrate to obtain a configuration such as that shown in FIGS. 4 and 5. For example, the substrate can be selectively eroded by a water jet carrying abrasive particles.

Because the strain-isolated mirror 20 is a monolithic structure, there is no need to perform any assembly. In addition, the absence of different constituent materials reduces thermal stress resulting from mismatch of thermal expansion coefficients.

The body portion 34 of the strain-isolated mirror 20 can also be the stage 10. In this embodiment, there is no need to attach the strain-isolated mirror 20 to the stage 10 because the two structures are integral to each other.

The blade portion 38 includes a mirrored surface 54 opposed to the bottom surface 40. This mirrored surface 54 is the actual surface that is to reflect the measurement beam 24 of the first interferometer 18. As a result, the mirrored surface 54 must be polished smooth.

Since the structure supporting the blade portion 38 is not uniform across the strain-isolated mirror 20, the stiffness of the blade portion 38 is non-uniform. Polishing the mirrored surface 54 with planetary polishing equipment is therefore undesirable because the material removed depends on the pressure against the workpiece, which will inevitably vary across the blade portion 38. A preferred method for polishing the mirrored surface 54 relies on magnetorheologic finishing, such as that carried out by MRF equipment provided by QED of Rochester, N.Y.

Having described the invention, and a preferred embodiment thereof, what we claim as new, and secured by Letters Patent is:

1. A strain-isolated mirror comprising a substrate having integrated therein:
    a first body portion;
    a second body portion;
    a first connecting portion extending across a gap between said first body portion and said second body portion;
    a second connecting portion extending between said first body portion and said second body portion, said second connecting portion having
        a central portion having a first thickness and a first end portion adjacent to said first body portion, said first end portion having a second thickness smaller than said first thickness, and
        a second end portion adjacent to said second body portion, said second end portion having a third thickness smaller than said first thickness; and
    a first flexural hinge for coupling said first body portion to said second connecting portion.

2. The strain-isolated mirror of claim 1, wherein said second connecting portion further comprises a second flexural hinge for coupling said second body portion to said second connecting portion.

3. The strain-isolated mirror of claim 2, wherein said first connecting portion comprises a third flexural hinge for coupling said first body portion to said first connecting portion.

4. A strain-isolated mirror comprising a substrate having integrated therein:
    a first body portion:
    a second body portion:
    a first connecting portion extending across a gap between said first body portion and said second body portion, said first connecting portion including
        a first end portion having a first thickness and being adjacent to said first body portion,
        a second end portion having a second thickness and being adjacent to said second body portion, and
        a central portion between said first and second end portions, said central portion having a third thickness that is smaller than said first thickness and smaller than said second thickness; and
    a second connecting portion extending between said first body portion and said second body portion, said second connecting portion having
        a first flexural hinge for coupling said first body portion to said second connecting portion.

5. The strain-isolated mirror of claim 4, wherein said second connecting portion further comprises a second flexural hinge for coupling said second body portion to said second connecting portion.

6. The strain-isolated mirror of claim 5, wherein said first connecting portion comprises a third flexural hinge for coupling said first body portion to said first connecting portion.

7. The strain-isolated mirror of claim 4, wherein said second connecting portion comprises a central portion having a first thickness and a first end portion adjacent to said first body portion, said first end portion having a second thickness smaller than said first thickness.

8. The strain-isolated mirror of claim 7, wherein said second connecting portion further comprises a second end portion adjacent to said second body portion, said second end portion having a third thickness smaller than said first thickness.

9. A strain-isolated mirror comprising a substrate made of a material selected from the group consisting of: glass, metal, glass-ceramic matrix, low-expansion glass ceramic matrix, and ceramic, said substrate having integrated therein:
    a first body portion;
    a second body portion;
    a first connecting portion extending across a gap between said first body portion and said second body portion; and
    a second connecting portion extending between said first body portion and said second body portion, said second connecting portion having
    a first flexural hinge for coupling said first body portion to said second connecting portion.

10. The strain-isolated mirror of claim 9, wherein said second connecting portion further comprises a second flexural hinge for coupling said second body portion to said second connecting portion.

11. The strain-isolated mirror of claim 10, wherein said first connecting portion comprises
    a third flexural hinge for coupling said first body portion to said first connecting portion.

12. The strain-isolated mirror of claim 9, wherein said second connecting portion comprises a central portion having a first thickness and a first end portion adjacent to said first body portion, said first end portion having a second thickness smaller than said first thickness.

13. The strain-isolated mirror of claim 12, wherein said second connecting portion further comprises a second end portion adjacent to said second body portion, said second end portion having a third thickness smaller than said first thickness.

14. A semiconductor processing system having
    a stage having a first edge, said stage being translatable along a first direction; and
    a first strain-isolated stage mirror coupled to said first edge, said first strain-isolated stage mirror having a first body portion, a second body portion, a first connecting portion extending across a gap between said first body portion and said second body portion; and a second connecting portion extending between said first body portion and said second body portion, said second connecting portion having a first flexural hinge for coupling said first body portion to said second connecting portion.

15. The system of claim 14, further comprising a first interferometer disposed to illuminate said first edge with a first illumination beam.

16. The system of claim 14, wherein
    said stage includes a second edge, said stage being translatable along a second direction; and said system further comprises
    a second strain-isolated stage mirror coupled to said second edge, said second strain-isolated stage mirror having a first body portion, a second body portion, a first connecting portion extending across a gap between said first body portion and said second body portion; and a second connecting portion extending between said first body portion and said second body portion, said second connecting portion having a first flexural hinge for coupling said first body portion to said second connecting portion.

17. The system of claim 16, wherein said stage is translatable along a second direction parallel to said second edge.

18. The system of claim 14, further comprising a second interferometer disposed to illuminate said second edge with a second illumination beam.

19. The system of claim 14, further comprising a fastener for coupling said first strain-isolated stage mirror to said first edge.

20. The system of claim 14, wherein said first strain-isolated stage mirror optically contacts said first edge.

21. The system of claim 14, wherein said first strain-isolated stage mirror is adhesively coupled to said first edge.

22. The system of claim 14, wherein said first strain-isolated stage mirror is integral with said stage.

23. The system of claim 14, wherein said stage is translatable along a first direction parallel to the first edge.

* * * * *

UNITED STATES PATENT AND TRADEMARK OFFICE
CERTIFICATE OF CORRECTION

PATENT NO. : 6,646,779 B2
DATED : November 11, 2003
INVENTOR(S) : Peter B. Mumola, Flemming Tinker and Steven R. Patterson It is certified that error appears in the above-identified patent and that said Letters Patent is hereby corrected as shown below:

<u>Title page,</u>
Item [75], Inventors, replace "Peter B. Mumola, Trumball, CT (US)" with
-- Peter B. Mumola, Guilford, CT (US) --; and replace "Steven R. Patterson, Concord, CT (US)" with -- Steven R. Patterson, Concord, NC (US) --

<u>Column 2,</u>
Line 36, replace "show" with -- shows --

<u>Column 3,</u>
Line 47, replace "axes" with -- axis --

Signed and Sealed this

Sixth Day of April, 2004

JON W. DUDAS
*Acting Director of the United States Patent and Trademark Office*